United States Patent
DeRees et al.

[11] Patent Number: 5,899,522
[45] Date of Patent: * May 4, 1999

[54] INTERIOR TRIM PANEL FOR DOOR OF LIGHTWEIGHT AUTOMOBILE

[75] Inventors: Delbert D. DeRees, Romeo; David J. Kowall, Hartland, both of Mich.

[73] Assignee: DaimlerChrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/550,264

[22] Filed: Oct. 30, 1995

[51] Int. Cl.⁶ .................................................. B60J 1/17
[52] U.S. Cl. .................. 296/185; 296/37.13; 296/146.2; 296/146.7; 296/901; 49/354; 49/502
[58] Field of Search ............................. 296/37.13, 146.1, 296/146.2, 146.3, 146.5, 146.7, 152, 185, 901; 49/354, 502; 29/428

[56] References Cited

U.S. PATENT DOCUMENTS

| | | | |
|---|---|---|---|
| 3,596,979 | 8/1971 | Hablitzel et al. | 296/185 |
| 3,730,581 | 5/1973 | Parkinson | 296/37.13 |
| 4,831,710 | 5/1989 | Katoh et al. | 296/146.5 X |
| 4,945,682 | 8/1990 | Altman et al. | 296/146.5 X |

FOREIGN PATENT DOCUMENTS 378020  1/1940  Italy ..................................... 296/37.13

Primary Examiner—Andrew C. Pike

[57] ABSTRACT

A door for an automobile having opposed molded plastic sides includes a steel door frame hingedly connected to the body. An outer panel is attached to the door frame, and a unitary injection-molded inner panel is also attached to the door frame to hide from view components such as latching mechanisms and window operators that are disposed between the panels. The inner panel is formed with a depression, and an elastic net covers the depression, to establish a storage compartment.

6 Claims, 1 Drawing Sheet

INTERIOR TRIM PANEL FOR DOOR OF LIGHTWEIGHT AUTOMOBILE

RELATED APPLICATIONS

This patent application is related to commonly-assigned U.S. patent application Serial No. 08/540,297, filed Oct. 6, 1995: for an invention entitled "FOUR PIECE PLASTIC AUTOMOBILE BODY".

FIELD OF THE INVENTION

The present invention relates generally to automobiles, and more particularly to door trim panels for lightweight automobiles.

BACKGROUND AND SUMMARY OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that the cost of a lightweight automobile is relatively low because, among other things, a lightweight automobile can be propelled by a relatively small, fuel-efficient motor. Additionally, certain lightweight materials happen to be inexpensive, and easy to manufacture.

As further recognized by the present invention, it is advantageous to further reduce the weight and further simplify the construction of such an automobile by providing an interior, single-piece, lightweight door panel. As recognized herein, making a single piece door panel would advantageously cover the interior structure of the door of the automobile, while reducing the number of parts required to make the automobile and simplifying assembly of the automobile.

Additionally, the present invention recognizes that such an interior door panel ideally should afford features other than simply covering the interior components of the door. Accordingly, it is an object of the present invention to provide a single-piece lightweight injection-molded plastic interior door panel for an automobile. Another object of the present invention is to provide a lightweight door panel which is strong and which is adequately supported. Yet another object of the present invention is to provide a lightweight door panel that is easy to use and assemble, and that is cost-effective to manufacture.

A door for an automobile having a passenger compartment and a plastic body includes a rigid support frame that defines a periphery. The periphery establishes an opening, with the periphery being preferably continuous and closed. A hinge is connected to the frame and the automobile for hingedly connecting the frame to the automobile. Additionally, a unitary molded plastic trim panel is configured for mating with at least part of the periphery of the support frame to cover the opening. As intended by the present invention, the trim panel defines an interior surface facing the passenger compartment, with the interior surface being formed with at least one accessory member.

Preferably, the door includes a unitary molded plastic outer door cover which is configured for mating with at least part of the periphery of the support frame. Accordingly, the frame, trim panel, and outer door cover establish substantially all of the door of the automobile.

In a preferred embodiment, the accessory member is a depression formed in the trim panel. In this embodiment, the door further includes a net positioned over the depression and attached to the trim panel for establishing a storage pocket between the net and the trim panel. Moreover, the door includes a window and an operator attached to the window, and the accessory member is a slot for slidably engaging the operator. Furthermore, a door handle is preferably included, in which case the accessory member is an opening for receiving the door handle therethrough.

In another aspect of the present invention, an automobile includes a plastic body defining a passenger compartment, and a rigid support frame defining a periphery which establishes an opening. A hinge is connected to the frame and the body for connecting the frame to the body. Also, a unitary molded plastic trim panel is configured for mating with at least part of the periphery of the support frame to cover the opening. Per the present invention, the trim panel defines an interior surface facing the passenger compartment, and the interior surface is formed with at least one accessory member. A unitary molded plastic outer door cover is configured for mating with at least part of the periphery of the support frame. In accordance with the present invention, the frame, trim panel, and outer door cover establish substantially all of a door of the automobile.

In yet another aspect of the present invention, a method for covering a door opening in a plastic automobile body includes the steps of providing a steel door frame configured for mating engagement with the door opening. The method further includes molding a unitary plastic interior door panel having a depression formed therein, and then covering the depression with a net. The door panel is next attached to the door frame to cover the opening.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
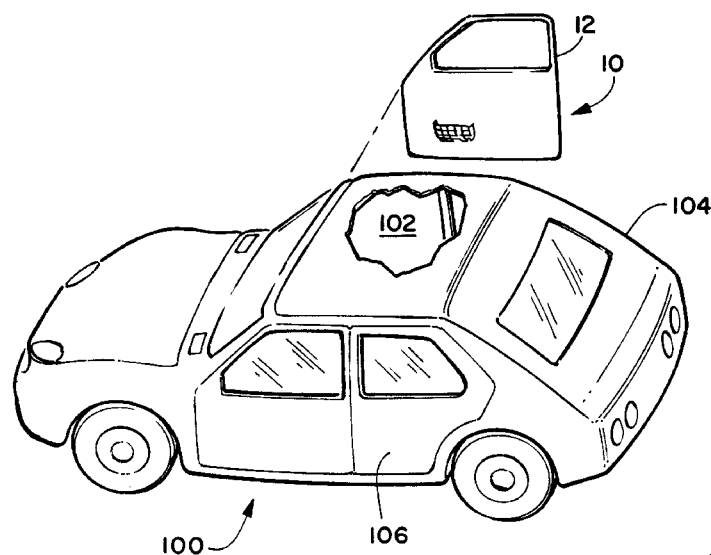
FIG. 1 is a perspective view of the automobile door of the present invention in an exploded relationship with an automobile.

Referring initially to FIG. 1, a lightweight, injection-molded plastic interior trim panel, generally designated 10, is shown associated with a door 12 of an automobile, generally designated 100, for selectively covering the passenger compartment 102 of the automobile 100. In the presently preferred embodiment, the automobile 100 includes an injection-molded plastic body having opposed lightweight sides 104, 106 which establish the passenger compartment 102 therebetween. The details of the automobile 100 are disclosed in the above-referenced patent application.

Figure 2:
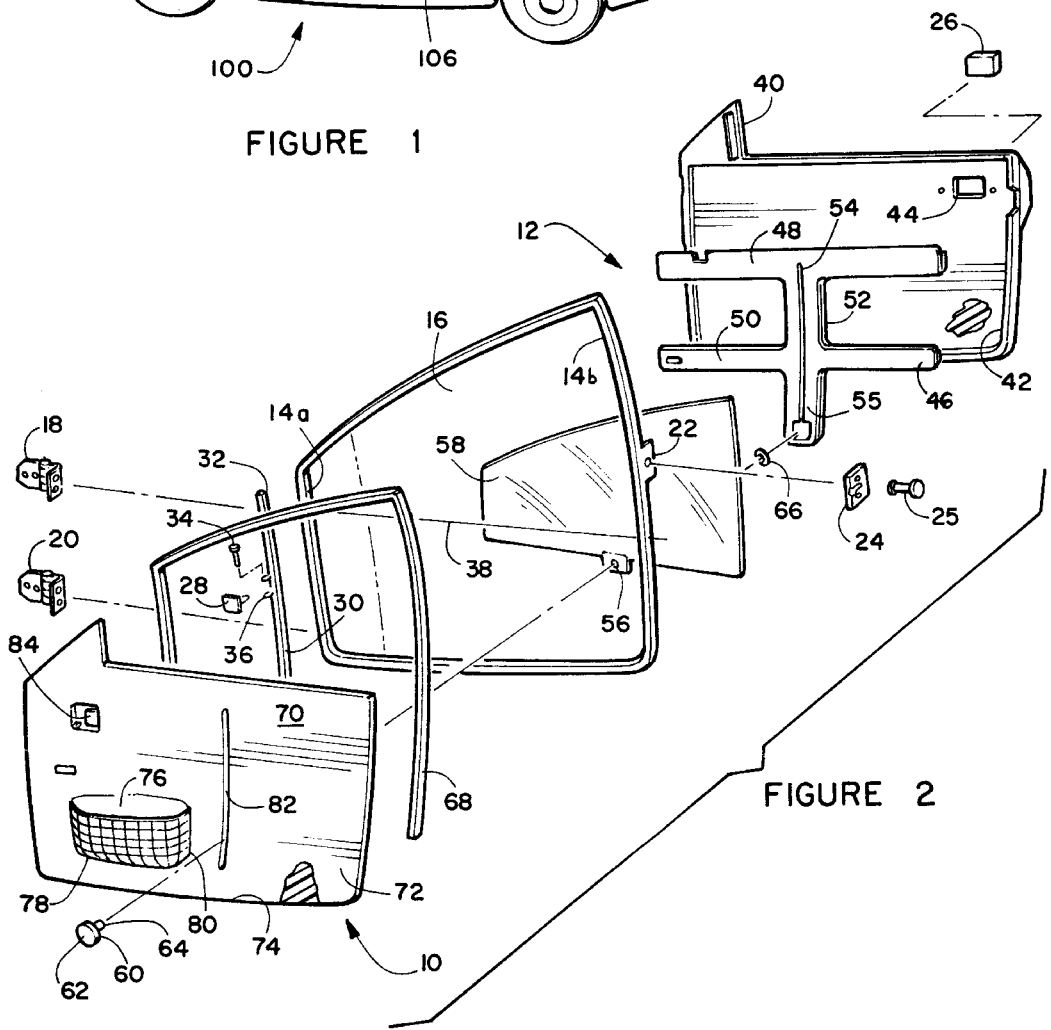
FIG. 2 is an exploded perspective view of the automobile door.

Referring to FIG. 2 for the details of the trim panel 10 and door 12, the door 12 includes a rigid, preferably steel or aluminum door frame 14. In the particular embodiment shown, the door frame 14 defines a somewhat trapezoidalshaped, continuous, closed periphery which establishes an opening 16 therethrough. It is to be understood that as used below, terms of orientation are referenced to the automobile 100.

In accordance with the present invention, top and bottom door hinges 18, 20 are attached by suitable means (e.g., by threaded fasteners) to a front edge 14*a* of the door frame 14. Furthermore, the door hinges 18, 20 are attached to the side 104 of the body of the automobile 100 for hingedly connecting the door frame 14 to the automobile 100. If desired, the side 104 of the body of the automobile 100 can be reinforced at the point of attachment to the hinges 18, 20.

Additionally, a door latch reinforcement element 22 is connected to a rear edge 14*b* of the door frame 14, while a door latch element 24 is connected to the door latch reinforcement element 22. The door latch element 24 can be any suitable automobile door latch which engages complementary structure, e.g, an elongated door latch striker 25 that is attached to the side 104 of the body 100, when the door 12 is closed. The latch 24 can be disengaged from the striker 25 to open the door by appropriately manipulating an associated outer door handle 26.

Alternatively, the latch element 24 can be disengaged from the striker 25 by appropriately manipulating an associated inner door handle 28. As shown, the inner door handle 28 is pivotably attached to an elongated rigid metal strength element 30 which is formed with a longitudinal channel 32. Per the present invention, the strength element 30 is welded, riveted, or bolted to the door frame 14, and is oriented generally parallel to the front edge 14*a* of the door frame 14.

To attach the inner door handle 28 to the strength element 30, a pivot pin 34 is positioned through a bracket 36 on the strength element 30, and the pivot pin 34 extends through the inner door handle 28. In turn, the inner door handle 28 is connected to an activating cable 38, and the cable 38 is further connected to the latch element 24 in accordance with well-known principles, such that appropriate manipulation of the inner door handle 28 disengages the latch element 24 from the striker 25.

As shown in FIG. 2, a single-piece, i.e., unitary, molded plastic outer door panel 40 is configured for mating with the periphery of the door frame 14. As intended by the present invention, the outer door panel 40 can be bolted or bonded to the door frame 14. Preferably, the outer door panel 40 is formed with an inboard-raised periphery 42, to strengthen the door panel 40. Also, an opening 44 is formed in the door panel 40 for receiving the outer door handle 26 therein.

To further strengthen the outer door panel 40, a molded plastic reinforcement member 46 is bonded to the door panel 40. As shown, the reinforcement member 46 includes two co-parallel fore-and-aft oriented elongated beams 48, 50 and a vertically-oriented beam 52. An elongated vertical groove 54 is formed in the vertical beam 52, and the groove 54 establishes a flange 55 for purposes to be shortly disclosed.

An operator bracket 56 is bonded to an automobile window 58. As shown in FIG. 2, an operator 60 includes a manually grippable handle 62 and a threaded shank 64, and the shank 64 extends through the operator bracket 56. It can readily be appreciated in reference to FIG. 2 that a retainer fitting 66 is threadably engaged with the shank 64 for holding the operator 60 in engagement with the operator bracket 56 and, thus, the window 58. It may now be further appreciated that the flange 55 is sandwiched between the retainer fitting 66 and the head 62 of the operator 60 and, consequently, that the operator 60 is slidably engaged with the groove 54 of the outer door panel 40. Accordingly, an occupant of the automobile 100 can slide the window 58 up and down relative to the door frame 14. If desired, a rubber window seal 68 can be mounted on the door frame 14 in accordance with principles well-known in the art.

Completing the detailed description of FIG. 2, a unitary molded plastic interior trim panel 70 is configured for mating with the periphery of the door frame 14 to cover the opening 16.

As shown, the interior trim panel 70 defines an interior surface 72, and it is to be understood that the interior surface 72 faces the passenger compartment 102. The interior trim panel 70 is bonded, riveted, or bolted to the door frame 14. When the interior trim panel 70 is to bolted to the door frame 14, a plurality of fastener holes 74 are formed along the edge of the panel 70.

In accordance with the present invention, the interior surface 72 of the interior trim panel 70 is formed with at least one accessory member. In the particular embodiment shown, the interior surface 72 is formed with a plurality of accessory members, including a depression 76 that is formed in the panel 70. An elastic net 78 is positioned over the depression 76, and the net 78 is attached to the trim panel for establishing a storage pocket between the net 78 and the interior trim panel 70. The net 78 may be fastened to the panel 70 by fasteners, or stretched over a lip 80 that is formed around the edge of the depression 76 and thereby elastically held onto the trim panel 70.

Additionally, as shown in FIG. 2, the interior surface 72 is formed with a slot 82 for slidably engaging the shank 64 of the operator 60. Furthermore, the interior surface 72 is formed with an opening 84 for receiving the interior door handle 28 therethrough.

With the above disclosure in mind, it is to be appreciated that the door frame 14, interior trim panel 70, and outer door panel 40 establish substantially all of the door 12 of the automobile 100. It is to be further appreciated that the novel interior trim panel 70 of the present invention establishes a portion of the body of the automobile 100, but that the metal door frame 14, and not the plastic body of the automobile 100, advantageously supports the weight of the door 12 and connects the door 12 with the automobile 100.

Still further, the interior trim panel 70 hides from view internal components, e.g., the cable 38, of the door 12. And, the trim panel 70 establishes a side storage pocket, as well as providing access to the window operator 60 and the interior door handle 28.

While the particular INTERIOR TRIM PANEL FOR DOOR OF LIGHTWEIGHT AUTOMOBILE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A door for an automobile having a passenger compartment and a plastic body, the door comprising:

a rigid support frame defining a periphery establishing an opening;

a hinge adapted to hingedly connect the frame to the automobile;

a window and an operator attached to the window; and a unitary plastic trim panel configured for mating with at least part of the periphery of the support frame to at least partially cover the opening, the trim panel defining an interior surface facing the passenger compartment, the interior surface having formed therein a slot for slidably engaging the operator.

2. The door of claim 1, further comprising a unitary plastic outer door cover configured for mating with at least part of the periphery of the support frame, wherein the frame, the trim panel, and the outer door cover establish substantially all of the door of the automobile.

3. The door of claim 2, wherein the periphery of the frame is continuous and closed.

4. The door of claim 3, wherein the trim panel has a depression formed therein, and the door further includes a net positioned over the depression and attached to the trim panel for establishing a storage pocket between the net and the trim panel.

5. The door of claim 3, further comprising a door handle, wherein the trim panel includes an opening for receiving the door handle therethrough.

6. An automobile comprising:

a plastic body defining a passenger compartment;

a rigid support frame defining a continuous closed periphery establishing an opening;

a hinge adapted to connect the frame to the body;

a window and an operator attached to the window;

a unitary plastic trim panel configured for mating with at least part of the periphery of the support frame to cover the opening, the trim panel defining an interior surface facing the passenger compartment, the interior surface being formed with a depression and a slot for slidably engaging the window operator;

a net positioned over the depression and attached to the trim panel for establishing a storage pocket between the net and the trim panel; and a unitary plastic outer door cover configured for mating with at least part of the periphery of the support frame, wherein the frame, the trim panel, and the outer door cover establish substantially all of a door of the automobile.

\* \* \* \* \*